United States Patent [19]
Leaf

[11] 3,754,145
[45] Aug. 21, 1973

[54] IN SITU FLUOROMETER

[75] Inventor: William Benjamin Leaf, Silver Spring, Md.

[73] Assignees: Prototypes, Incorporated, Kensington, Md.; Zone Research Incorporated, Washington, D.C.

[22] Filed: Feb. 9, 1972

[21] Appl. No.: 224,713

Related U.S. Application Data
[62] Division of Ser. No. 134,781, April 16, 1971, Pat. No. 3,649,833.

[52] U.S. Cl.......... 250/218, 250/71 R, 250/220 SD
[51] Int. Cl.. G01n 21/16, G01n 21/26, G01n 21/38
[58] Field of Search ..................... 250/218, 220 SP, 250/71 R, 71 G, 77

[56]  References Cited
UNITED STATES PATENTS
| | | | |
|---|---|---|---|
| 3,354,772 | 11/1967 | Topol................................ | 250/218 |
| 2,403,631 | 7/1946 | Brown............................... | 250/71 R |
| 3,151,204 | 9/1964 | Stacy............................... | 250/71 R |

*Primary Examiner*—James W. Lawrence
*Assistant Examiner*—T. N. Grigsby
*Attorney*—Sughrue, Rothwell & Mion

[57]  ABSTRACT

Disclosed herein is a self-contained submersible fluorometer designed for the continuous in situ recording of concentrations of materials in an aqueous environment, said materials being stimulated to fluoresce when excited by light of proper wavelengths.

1 Claim, 9 Drawing Figures

Patented Aug. 21, 1973
3,754,145
2 Sheets-Sheet 1
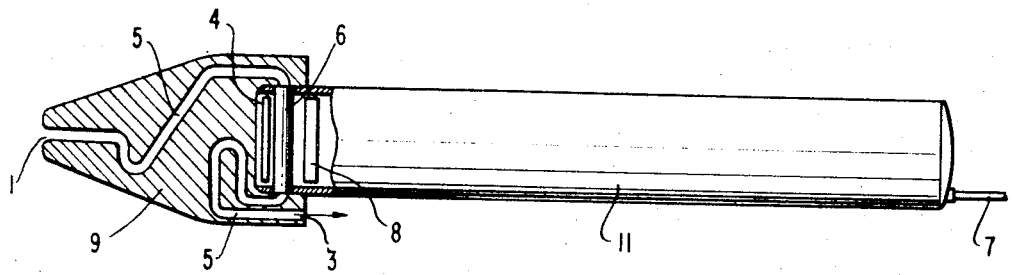
FIG. 1
FIG. 2
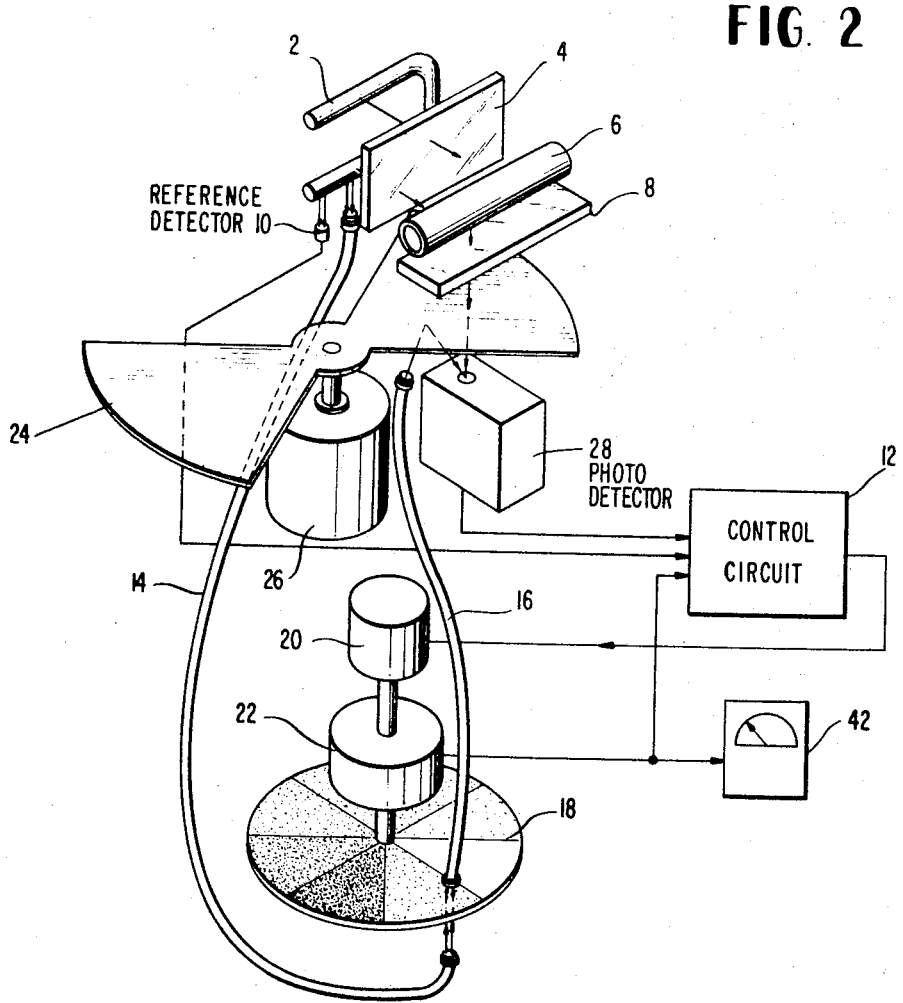

IN SITU FLUOROMETER

This is a division of application, Ser. No. 134,781 filed Apr. 16, 1971 and now U.S. Pat. No. 3,649,833.

BACKGROUND OF THE INVENTION

The invention is in the field of fluorometers and more specifically in the field of fluorometers used to measure concentrations of fluorescing material, said concentration measurements being used to study the effects of pollutants and man's activities in the aqueous environment.

The basis of fluorometer measurements to detect material concentrations is that certain materials exhibit unique, repeatable fluorescent characteristics. In particular, when excited by light of certain wavelengths, these materials respond by emitting light in another, longer wavelength band. By selecting proper light sources, optical filters and optical detectors, materials which exhibit fluorescence can be detected and their concentrations measured with a great degree of accuracy over a wide range of concentrations in various natural backgrounds.

The detectability of the unique fluorescent signatures of various materials in solution forms the basis for the application of the fluorometer to studies directed at the solution to water pollution problems. Fluorometer measurements are extremely useful in the area of water pollution studies from two aspects. First, by injecting samples of a fluorescent tracer material into a body of water, studies may be made of the dispersion and dilution rates of aqueous contaminant fields. Thus, fluorometer measurements can be used to predict the effect of the injection of contaminant fields into the water body. Second, it is possible to determine the effects of pollution or human activities on the ability of a body of water to support a standing crop of phytoplankton which is a basic link in the marine food chain. This is achieved by the measurement of fluorescent chlorophyll which is found in the phytoplankton and forms a sensitive indicator of the presence and density of phytoplankton in the aqueous environment under study.

In the past, such studies have been attempted by pumping samples of the body of water under consideration to surface fluorometers or by the collection of discrete deep samples by submerged sampling bottles. However, there are many disadvantages with these prior methods. First, pumped samples become mixed or smeared in the pumping hose and the resolution and sensitivity of a surface fluorometer to detect small scale concentration gradients is lost. Further, it is extremely difficult to make continuous concentration profiles at depths greater than about 15 meters. Finally, it has been impossible to access the changes in sample characteristics occasioned by pumping forces and by pressure changes and temperature variations encountered by the sample during transit to the surface.

The above problems are overcome completely by the in situ fluorometer of this invention which provides real-time, continuous measurement capabilities. The in situ fluorometer operates within the aqueous environment itself thus eliminating the requirement of bringing a sample of water to the surface. The fluorometer disclosed herein permits concentration measurements at depths of 200 meters and beyond, permitting dispersion and dilution studies at depths greater than 15 meters where bottom effects are critical to understanding local dispersion characteristics.

Further, in the measurement and analysis of concentrations of photosynthetic phytoplankton a deep measurement capability is particularly useful as the depth of the photic zone, in which solar energy is utilized in the photosynthesis process, frequently exceeds 50 meters and the phytoplankton drift or are mixed to considerably deeper depths.

SUMMARY OF THE INVENTION

The instrument of this invention provides a self-contained submersible fluorometer for the continuous in situ recording of concentrations of fluorescing material in a body of water under study. The fluorometer employs the double beam optical bridge principal which permits the measurements of very low fluorescent levels which occur when measuring relatively small concentrations of material samples in large bodies of water.

Utilizing this principal, a light chopper permits a photodetector to look alternately at the emission from the fluorescing sample and a reference light in a standard balancing path of the bridge. The reference light in the balancing path is adjusted by a servo driven, circular neutral density wedge filter which has a continuous tranmissibility variation of several decades of light. The photodetector output is demodulated by a synchronous detector, using as a synchronous reference signal, light derived from the exciting light source chopped by the rotation of the light chopper. The detector output is used to energize a servo motor. The polarity of the motor drive voltage is such that the circular neutral density wedge filter is rotated in the direction required to maintain a light balance in the optical bridge. Coupled to the servo motor and the neutral density wedge filter is a position potentiometer with a wiper arm geared to the neutral density filter. The output voltage from the position potentiometer is a potential proportional to the intensity of the fluorescence which is indicative of the concentration of the sample material.

BRIEF DESCRIPTION OF THE DRAWINGS

FIG. 1 illustrates the basic external configuration of the fluorometer of this invention with a portion of the outer cover removed to illustrate a section of the internal fluorometer structure;

FIG. 2 illustrates the internal structure of the in situ fluorometer;

DETAILED DESCRIPTION OF THE PREFERRED EMBODIMENT

Figure 3:
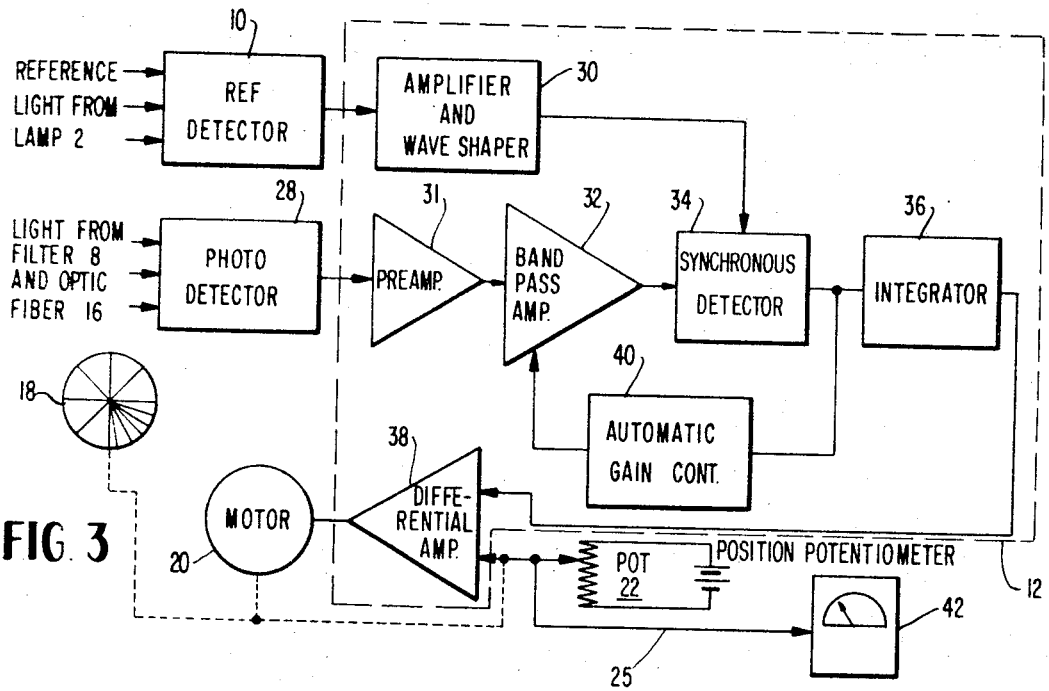
FIG. 3 is a schematic diagram of the electrical components of the fluorometer.

FIG. 1 illustrates the basic configuration of the in situ fluorometer of the invention. The fluorometer is generally cylindrical in shape having a faired nose piece 9 defining an undulating internal passageway or duct 5 through which water is caused to flow. The instrument can either be towed behind a moving boat or placed at rest in a flowing stream with the faired nose portion of the instrument facing the current. In either case, the pressure difference between the intake duct 1 and the outlet duct 3 causes water to flow through a transparent cuvette 6. Between the inlet 1 and the outlet 3 is positioned a curved duct 5 for carrying the water sample to and from the cuvette 6. The duct 5 is internally blackened and is so shaped to block ambient light from reaching the cuvette.

Filter 4 passes light from an excitation source which emits radiation at wavelengths which excite the sample material, whose concentration is to be detected, to fluorescence. As the material fluoresces, filter 8 passes only those wavelengths of light which correspond to the characteristic fluorescence of the sample material.

Coupled to the instrument is cable 7 which may serve as a towing cable, an information carrying line for transferring to the surface the detected concentration information and for carrying operating power from a surface power supply to the instrument. It is, of course, possible for the concentration information to be recorded on board the fluorometer by including therein a suitable recorder. Further, the fluorometer can be totally self-contained by including a battery within the cylinder 11 for operating the instrument. Utilization of a battery within the instrument alleviates the requirement of transferring power from the surface through the cable 7 to the fluorometer. The cable may be removably attached to cylinder 11 by a water proof connector.

Figure 4:
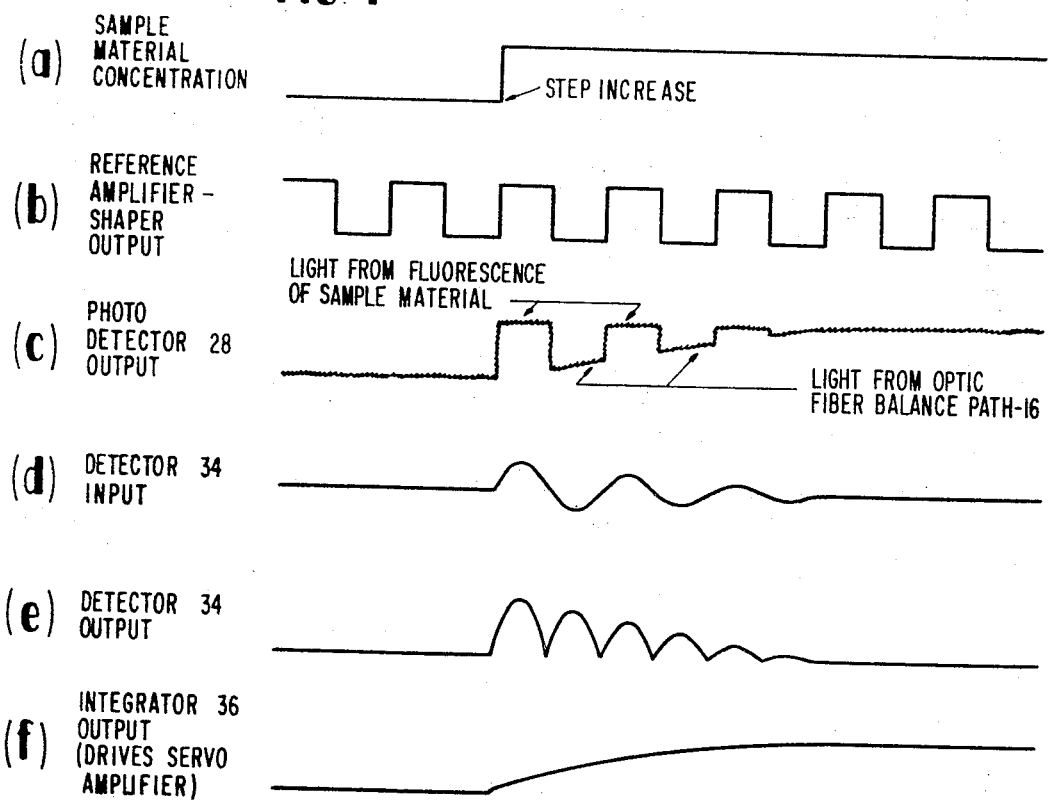
FIGS. 4a thru 4f are a timing diagram corresponding to the operation of the circuitry of FIG. 3.

The double beam optical bridge of this invention and its operation will now be described with reference to FIGS. 2, 3, and 4. As water containing the sample material under study passes through transparent cuvette 6, light from lamp 2 passes through excitation filter 4 exciting the material to fluorescence. Lamp 2 may be a fluorescent lamp or any other light source which emits radiation containing wavelengths suitable for exciting the material under study. Excitation filter 4 permits the passage of only those wavelengths suitable for exciting the material. The resulting fluorescent light as well as some light from filter 4 impinge emission filter 8. Filter 8 is selected to pass only those wavelengths from the desired fluorescent light to the photodetector 28.

The light chopper comprises a light shutter 24 rotated by shutter motor 26. The underside of the shutter is reflective to indicent light. Thus, when the shutter is in the position shown in FIG. 2, the light output from filter 8 is blocked from the photodetector 28, while the light output from optic fiber 16 is reflected onto the photodector by the underside of the shutter. Optic fiber 16 is positioned between the light shutter 24 and the neutral density wedge filter 18 such that the input to the optic fiber is controlled by the transmissibility of the wedge filter. Thus, optic fiber 16 provides the balancing path, with the light traveling therethrough acting as the reference light for the double beam optical bridge.

The light for the balancing pathes transmitted by optic fiber 14, one end of which is positioned to receive light from lamp 2 with the other end being positioned to emit light toward the underside of the wedge filter opposite the lower end of the optic fiber 16. It should be understood that optic fiber 14 can be deleted by utilizing a second light source radiating directly on the underside of the wedge filter 18.

When the bridge is balanced, wedge filter 18 is positioned such that the intensity of light at the output of optic fiber 16 is equal to the intensity of the fluorescent light originating in cuvette 6 and passing through filter 8. The position potentiometer 22 is geared to the wedge filter so that its output potential uniquely defines the wedge filter position. Since the position of the wedge filter is correlatible to the intensity of the fluorescence, and since the amount of fluorescence is proportional to the concentration of the sample material in the water flowing through cuvette 6, the output potential of the potentiometer is thus proportional to the sample concentration.

By continuously plotting the output of the potentiometer 22 as the fluorometer is caused to move either vertically or horizonally through the body of water under study, vertical and horizonal profiles of material concentrations can be obtained for use in circulation and dilution studies. For example, to predict the dispersion of aqueous contaminant fields in a body of water, a tracer dye such as rhodamine B dye can be added to the aqueous environment. Filter 4 is then selected to pass radiation which excites the rhodamine to fluorescence while filter 8 is selected to pass the wavelength band characteristic of fluorescing rhodamine.

Since the dispersion of the tracer dye will generally correspond to the dispersion of a contaminant injected into the water as industrial waste, an accurate prediction of the dispersion of such industrial waste within the body of water can be made.

On the other hand, if the concentration of phytoplankton is to be determined, one need only replace excitation filter 4 with a filter which passes radiation over those wavelengths which excite chlorophyll to fluorescence. Emission filter 8 is selected to pass those wavelengths characteristic of fluorescing chlorophyll. Photodetector 28 is selected to be sensitive to all the wavelengths under consideration. That is, in making concentration measurements the photodetector is sensitive to the wavelengths emitted by the excitation lamp 2 as well as the wavelengths which pass through the emission filter 8.

The operation of the light bridge will now be described with particular reference to FIGS. 3 and 4. Common numerical destinations in FIGS. 2 and 3 identify common elements. Thus, photodetector 28 in FIG. 2 corresponds to the like identified photodetector in FIG. 3.

As shutter 24 rotates under the control of motor 26 the input to photodetector 28 alternately receives light from the optic fiber 16 and the emission filter 8. The output of the photodetector is coupled to a control circuit 12. The control circuit is shown in detail in FIG. 3. The photodetector output is coupled to a preamplifier 31. Thus, the output from the photodetector is amplified and passed to a bandpass amplifier 32. The output from amplifier 32 appears as the input to synchronous detector 34. A synchronous reference signal is derived from a reference photodetector 10 which receives light from the excitation lamp 2. The light which impinges reference detector 10 is chopped by the light shutter 24 as it rotates under the control of the shutter motor 26. The synchronous detector output is coupled to an integrator 36 and an automatic gain control circuit 40. The automatic gain control circuit is connected in a feedback loop to the bandpass amplifier 32, and acts to maintain a constant reference or d.c. level in the output of the amplifier. The output of the integrator is supplied to a differential servo amplifier 38 which controls the rotation of servo motor 20. Servo motor 20 is mechanically coupled to the neutral density wedge filter 18 and to the wiper arm of the position potentiometer 22. The potentiometer wiper arm is electrically coupled by line 25 to a recorder 42 which records the potentiometer output potential.

Let it be assumed that the sample material concentration is initially at some low level as illustrated in FIG. 4a. As shutter 24 rotates, chopping the input light to reference photodetector 10, a synchronizing signal is generated and applied to the amplifier and wave shaper circuitry 30. The output of circuit 30 is the square wave illustrated in FIG. 4b. With the concentration of the sample material at a constant level for a time sufficient to balance the optical bridge, the output of the photodetector 28 appears as a generally constant level waveform (FIG. 4c). The output from the photodetector 28 passes through the bandpass filter-amplifier 32 to produce an input to the synchronous detector 34 as illustrated in FIG. 4d. The output of the detector appears as illustrated in FIG. 4e. The integrator acts to integrate the output from the detector 34 to produce a waveform as illustrated in FIG. 4f. Synchronous detector circuits are generally known in the art and a full description thereof is unnecessary for an understanding of the invention. They generally function to produce an output signal indicative of the mismatch or difference between the two portions of a mixed input signal that has been demodulated in accordance with a synchronizing signal.

Let it now be assumed that there is a rapid rise in the concentration of the fluorescing sample material in the body of water through which the fluorometer is passing. This is illustrated in FIG. 4a by a step increase in the sample material concentration. Since an increase in sample material concentration causes a corresponding increase in the intensity of fluorescence, there is a rapid rise in the output from the photodetector 28 during those periods when it is viewing the light from the cuvette, thus causing a fluctuating signal to appear at the input to the detector 34 as shown in FIG. 4d.

This results in a pulse train at the output of detector 34, as shown in FIG. 4e, whose magnitude decreases as bridge balance is restored. As a result, the output from the integrator begins to increase causing an imbalance between the inputs to the differential servo amplifier 38. The servo motor 20 begins to rotate in a direction to drive the circular neutral density wedge filter 18 in a direction required to restore a light balance in the optical bridge. Thus, in this example, the servo motor would rotate in a direction to cause the transmissibility of the wedge filter 18 to increase in the area between the optic fibers 14 and 16. In addition, as the servo motor rotates, the wiper arm of position potentiometer 2 moves in the direction to balance the inputs to the differential servo amplifier 38. Thus, as seen from FIG. 4c the output from photodetector 28 corresponding to the light from the optic fiber 16 increases in response to the detection of an increase in fluorescence of the sample material. As the intensity of light in the balancing path increases, the intensity difference in the two arms of the bridge decreases thus explaining the decaying waveform in FIG. 4d. As a result, there is a corresponding decrease in the output from detector 34.

As previously described, the automatic gain control circuit 40 assures that the output of the bandpass amplifier 32 assumes a constant reference level when the bridge is balanced. Integrator 36 may be a resistance-capacitor circuit which stores energy received from the detector. When the output of the detector falls back to its reference level in response to the balancing of the optical bridge, the output of the integrator levels off at some new value determined by the energy stored in the integrator circuitry.

The output potential from the position potentiometer 22 is recorded by coupling the wiper arm of the potentiometer to a suitable recording means 42 through cable 25. When the recording means is contained within the fluorometer, cable 25 runs directly to the recording means. However, if the recording means is located on the surface, cable 25 is incorporated into cable 7.

In an actual embodiment of the complete fluorometer of the invention, the cylindrical housing 11 may be provided with diving fins or depressors, as is known in the art, to achieve a desired towing depth and stability when in use.

While the invention has particularly shown and described with reference to a preferred embodiment thereof, it will be understood by those skilled in the art that various changes in form and detail may be made therein without departing from the spirit and scope of the invention.

What is claimed is:

1. An apparatus for measuring in situ the light generated by fluorescing materials suspended in a liquid medium comprising:
   a. a transparent, hollow sample chamber open at both ends for carrying the liquid medium,
   b. means for illuminating the sample chamber to cause fluorescence,
   c. means for sensing the light generated by fluorescing material within the sample chamber,
   d. said sensing means comprising an optical bridge having two optical paths, the sample chamber being disposed in one path and reference means being disposed in the other path,
   e. a sealed container internally mounting the illuminating means and the sensing means,
   f. means mounting the sample chamber within the container,
   g. said container including a faired nose portion containing curved inlet and outlet ducts connected to the open ends of the sample chamber for providing a path for the liquid medium through the apparatus, the curvature of the ducts shielding ambient light from the sample chamber, and
   h. opaque, light absorbing means surrounding the container for further shielding ambient light from the sample chamber.

* * * * *